US012215845B2

(12) United States Patent
Anderton

(10) Patent No.: US 12,215,845 B2
(45) Date of Patent: Feb. 4, 2025

(54) BATTERY POWERED LED LIGHT SYSTEM FOR USE IN AN AC LIGHTING FIXTURE SOCKET

(71) Applicant: GLOWBY LIGHTING, LLC, Delray Beach, FL (US)

(72) Inventor: Maria Anderton, Delray Beach, FL (US)

(73) Assignee: GLOWBY LIGHTING, LLC, Delray Beach, FL (US)

(*) Notice: Subject to any disclaimer, the term of this patent is extended or adjusted under 35 U.S.C. 154(b) by 0 days.

(21) Appl. No.: 18/416,043

(22) Filed: Jan. 18, 2024

(65) Prior Publication Data

US 2024/0247794 A1 Jul. 25, 2024

Related U.S. Application Data

(60) Provisional application No. 63/439,911, filed on Jan. 19, 2023.

(51) Int. Cl.
*F21V 23/00* (2015.01)
*F21V 3/06* (2018.01)
(Continued)

(52) U.S. Cl.
CPC .......... *F21V 23/005* (2013.01); *F21V 3/0625* (2018.02); *F21V 19/006* (2013.01);
(Continued)

(58) Field of Classification Search
CPC .... F21V 23/005; F21V 3/0625; F21V 19/006; F21V 23/006; F21V 23/0428; F21Y 2105/18; F21Y 2115/10
See application file for complete search history.

(56) References Cited

U.S. PATENT DOCUMENTS 10,429,020 B2 * 10/2019 Grandadam ............ F21K 9/237
2005/0162864 A1 * 7/2005 Verdes .................... F21K 9/232
362/555

(Continued)

FOREIGN PATENT DOCUMENTS

CN 206449570 U * 8/2017

OTHER PUBLICATIONS

Wu, CN 206449570 U,machine translation (Year: 2017).*

*Primary Examiner* — Tracie Y Green
(74) *Attorney, Agent, or Firm* — Rothwell, Figg, Ernst & Manbeck, P.C.

(57) ABSTRACT

An LED light includes a housing. The housing includes a bulb shaped upper end extending from a nonconductive threaded lower end. The interior of the housing has a charging port extending from the threaded lower end. A battery enclosure is electrically coupled to the charging port. A first PCB board is positioned within upper end. A power circuit is formed on the first PCB board and is electrically coupled to the battery enclosure to provide DC power to the first PCB board. A second PCB board is positioned within upper end of the housing; stacked over the first PCB board. The first PCB board is electrically connected to the second PCB board. A plurality of LEDs are arranged on the second PCB board to direct light from a distal end of the upper end of the housing in response to receiving a control signal and power from the second PCB board.

10 Claims, 4 Drawing Sheets

(51) Int. Cl.
*F21V 19/00* (2006.01)
*F21V 23/04* (2006.01)
*F21Y 105/18* (2016.01)
*F21Y 115/10* (2016.01)

(52) U.S. Cl.
CPC ........ *F21V 23/006* (2013.01); *F21V 23/0428* (2013.01); *F21Y 2105/18* (2016.08); *F21Y 2115/10* (2016.08)

(56) References Cited

U.S. PATENT DOCUMENTS

2006/0215422 A1* 9/2006 Laizure, Jr. ............. F21K 9/232 362/267
2010/0264806 A1* 10/2010 Yu .......................... H05K 1/144 313/317
2013/0271998 A1* 10/2013 Merschon ............... F21K 9/232 29/829
2014/0043821 A1* 2/2014 Bhattarai ................ F21K 9/232 703/2
2018/0163934 A1* 6/2018 Miller ..................... F21L 4/005
2020/0292138 A1* 9/2020 Crayford ................. F21K 9/235

* cited by examiner

BATTERY POWERED LED LIGHT SYSTEM FOR USE IN AN AC LIGHTING FIXTURE SOCKET

CROSS REFERENCE TO RELATED APPLICATION

This application claims priority to U.S. Provisional Application No. 63/439,911 filed Jan. 19, 2023, the contents of which are herein incorporated as if fully set forth herein.

BACKGROUND OF THE INVENTION

The present invention is directed to a light bulb, and more particularly, to a battery operated LED light assembly adapted for long term use in conventional light bulb sockets.

As known in the art, incandescent lights contain filaments, which are heated by running current therethrough, to produce light. These lights rely upon AC current supplied at a light socket into which the conventional light bulb is screwed. These lights have worked for over a century, but are being actively phased out from general lighting applications in favor of light emitting diode ("LED") lights which consume less electricity and have longer lifetimes. However, to an almost ubiquitous extent in North America and continental Europe, the infrastructure for general and task lighting relies upon the form factor created for the now obsolete incandescent lighting, namely an Edison Screw connection to mainline AC power and in compliance with international standards.

The Edison Screw is a standard lightbulb socket for electric light bulbs as known in the art, by way of example as described in U.S. Pat. No. 251,554, issued in the name of Thomas Edison. Generally, bulbs with an Edison Screw connection have right-handed threaded metal bases which screw into matching threaded sockets. For bulbs powered by AC current, the thread is generally connected to neutral and a contact on the bottom tip of the base is connected to the live phase. This socket has become so ubiquitous that such connections are now defined in American National Standards Institute (ANSI) and international Electrotechnical Commission (IEC) publications. Generally, the two standards harmonized, although several types of screw mounts are still defined in only one standard.

An LED lamp or LED light bulb is a type of light bulb also known in the art. Again, LED lamps are significantly more energy efficient than equivalent incandescent lamps and can be significantly more efficient than most fluorescent lamps. However, LED lamps suffer from the deficiency that they are solid state and require controlled direct current (DC current) for power. Such DC power may be provided by batteries.

As a result of the need for DC power for the LED lightbulbs the prior art has adopted two approaches to commercialization of LED lighting. The first approach is direct replacement of the incandescent bulb; in other words, make use of AC power. These suffer from the disadvantage that the bulbs require an AC to DC power converter within the bulb itself. The form factor for conventional bulbs were not built to accommodate this new structure.

A second approach is to use batteries to supply the DC power. This frees the form factor from conforming to the conventional Edison Socket. The battery housing may take non-Edison socket, or even non bulb shapes, to house the batteries and are generally affixed to working locations with adhesives or mechanical fasteners such as screws. They are generally controlled by an on-board switch or remote control. However, these suffer from the disadvantage that the Edison Sockets conventional light fixtures and chandeliers have the prior art AC socket, and in order to be used with conventional light bulbs, or even AC enabled Led lights, in an area which does not currently have power, requires extensive work by an electrician to place the fixture in an unwired area and be used for lighting.

Accordingly, a structure for an LED bulb for use in conventional sockets, which overcomes the shortcomings of the prior art is desired.

SUMMARY OF THE INVENTION

An LED light includes a housing. The housing includes a bulb shaped upper end extending from a nonconductive threaded lower end. The interior of the housing has a charging port extending from the threaded lower end. A battery enclosure is electrically coupled to the charging port. A first PCB board is positioned within the upper end. A power circuit is formed on the first PCB board and is electrically coupled to the battery enclosure to provide DC power to the first PCB board. A second PCB board is positioned within upper end of the housing; stacked over the first PCB board. The first PCB board is electrically connected to the second PCB board. A plurality of LEDs is arranged on the second PCB board to direct light from a distal end of the upper end of the housing in response to receiving a control signal and power from the second PCB board.

A switch is mounted on an exterior surface of the bulb shaped upper end and is electrically coupled to at least one of the power circuit and each of the LEDS for selectively providing power to the LEDs. The second PCB board has control circuitry controlling operation of the lighting system.

The threaded lower end is dimensioned to be received by an Edison socket. The charging port being a USB.

BRIEF DESCRIPTION OF THE DRAWINGS

The present disclosure will be better understood by reading the written description with reference to the accompanying drawing figures in which like reference numerals denote similar structure and refer to like elements throughout in which.

DETAILED DESCRIPTION OF THE PREFERRED EMBODIMENTS

Figure 1:
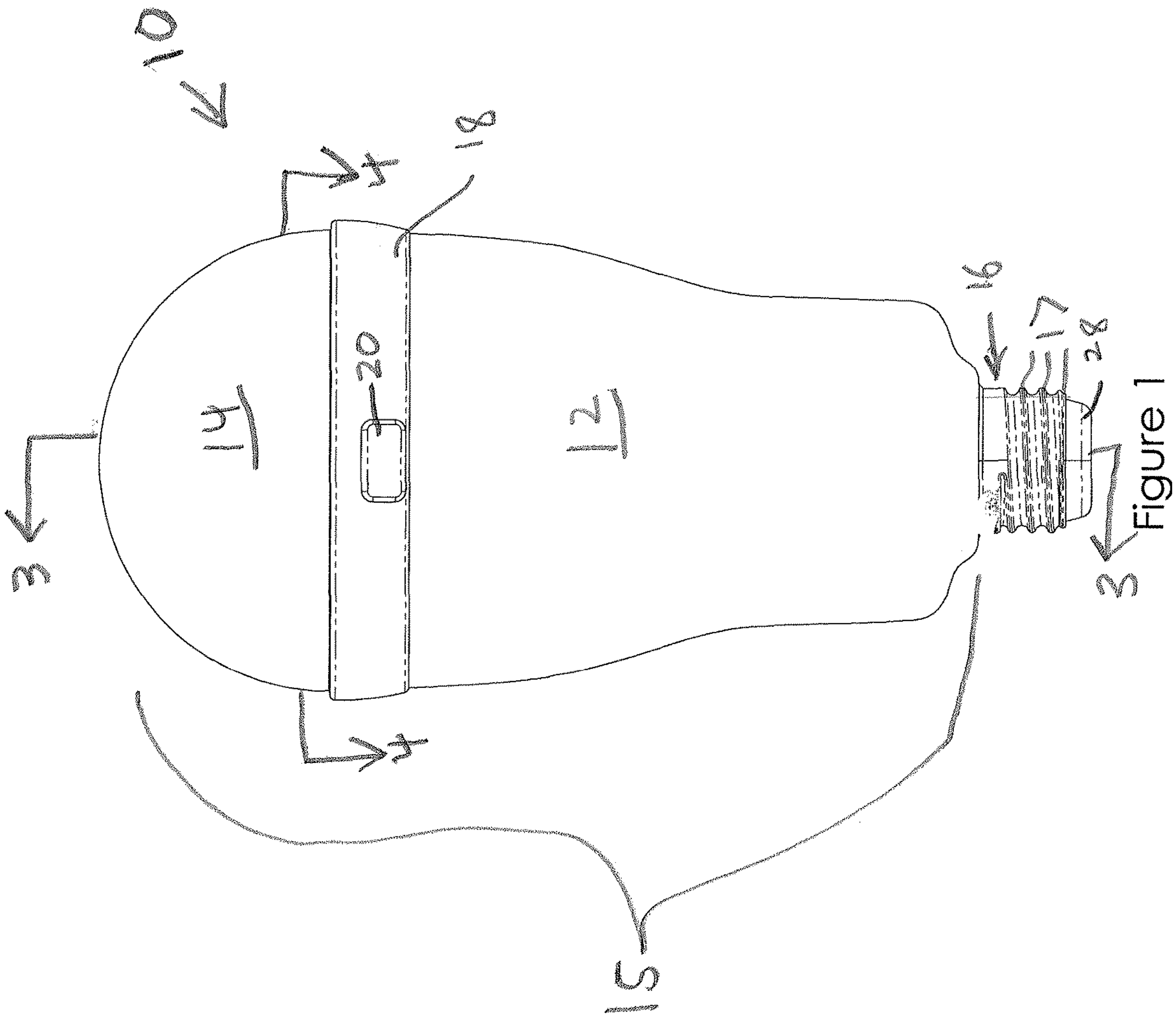
FIG. 1 a side elevation view of the lighting system constructed in accordance with the invention.
Figure 2:
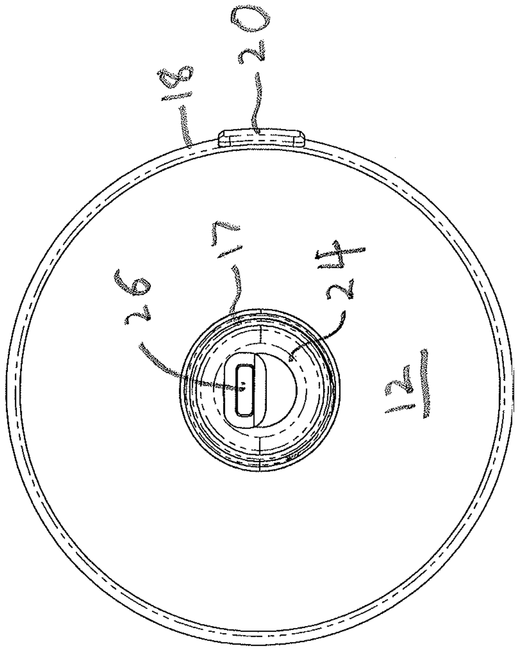
FIG. 2 is a bottom plan view of the lighting system constructed in accordance with the invention.

Reference is now made to the drawings, wherein like reference numerals indicate like structure. Reference is first made to FIGS. 1 and 2 in which a battery-operated LED light 10 includes a housing generally indicated as 15 having an arbitrary bulb shape terminating at one end in a non-conductive threaded cap 16 serving as a base. While an otherwise standard arbitrary bulb shape is preferred, other standard incandescent bulb shapes such as a candelabra, globe or other similar equivalent shapes may be used.

Base 16 includes threads 17 disposed about the base 16. Base 16 and threads 17 are preferable sized and to be received and secured by a conventional Edison socket. Base 16 is nonconductive, and preferably made from material that is an electrical insulator, but adapted to threadingly engage, via threads 17, with an Edison socket in a manner mimicking conventional incandescent lights, but without drawing current when installed. In this way the LED light 10 of this application can be substituted into existing lighting structure without a need to modify the existing light infrastructure in homes or offices.

As seen more particularly in FIG. 2, a charging slot 26 is formed in a bottom portion 24 of base 16. Charging slot 26 is a DC charging slot, and preferably a USB Slot for receiving a USB charging connector. In a preferred non limiting embodiment a non-electrically conductive spacer 28 may extend beyond threads 17, to isolate charging slot 26 from contacting Edison Socket in which it resides during use.

A lower lamp housing 12 extends from base 16 to form a portion of housing 15. An upper lamp housing 14 extends from lower lamp 12 to form an enclosed housing 15. Upper lamp housing 14 and lower lamp housing 12 may be joined together by a threaded screw structure, friction fit, or even formed as a unitary structure.

Figure 3:
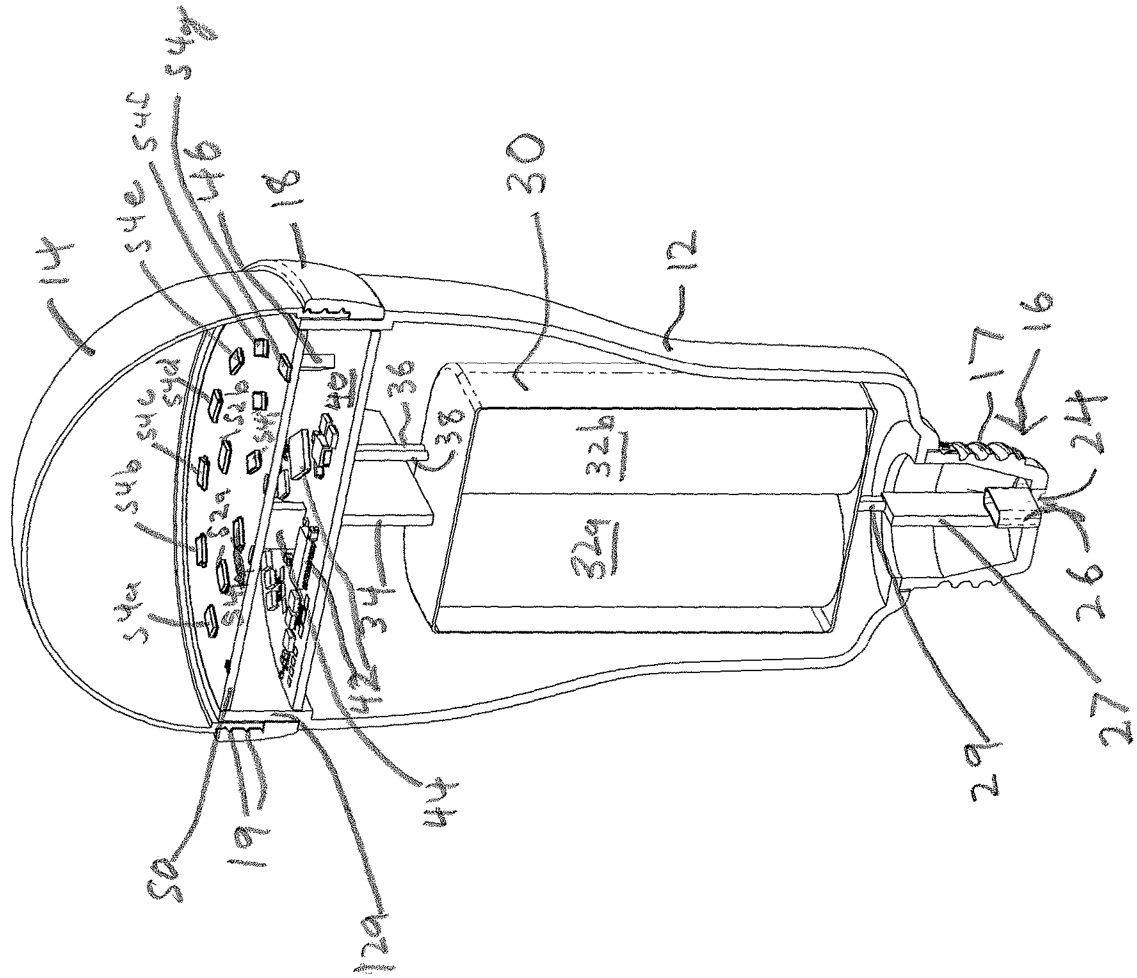
FIG. 3 is a sectional view taken along line 3-3 of FIG. 1.
Figure 4:
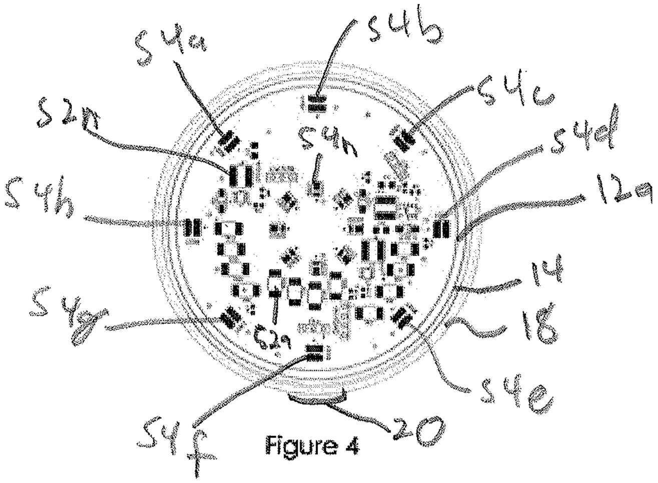
FIG. 4 is a sectional view taken along line 4-4 of FIG. 1.

In a preferred non limiting embodiment, as seen in FIGS. 2 and 3, a diffuser connector 18 receives and rests on an upper portion 12*a* of lower lamp housing 12. Diffuser connector 18 may rest on a ledge 12*a* formed as part of 152 ower housing 12. Diffuser connector 18 receives a lower portion 14*a* of upper lamp housing 14. Upper portion 12*a* of lower lamp housing 12 is received by lower portion 14*a* of upper lamp housing 14 at a position adjacent diffuser connector 18. In the preferred non limiting embodiment, when assembled, lower portion 14*a* of upper lamp housing 14 is sandwiched between upper portion 12*a* of lower lamp housing 12 and diffuser connector 18. However, the inverse relationship is well within the scope of the invention.

In a preferred, non-limiting embodiment, at least upper lamp housing 14 is formed of a light diffusing material, preferably polycarbonate. It is translucent. Furthermore, to facilitate manufacture, lower portion 14*a* of upper lamp housing 14 may include threads 19 and diffuser connector 18 is formed with socket threads 21 for receiving threads 19 to secure upper housing 14 to diffuser connector 18, while providing access to the interior of the light 10.

As seen in FIG. 3, within housing 15, a USB port 26 for receiving a USB connector therein, terminates in charging slot 24 and extends within base 16. A power circuitry on a board 27 is electrically connected with USB port 26.

A battery casing 30, forming an on-board DC power source, is disposed within lower housing 12. Batteries 32*a*, 32*b* are disposed within battery casing 30. Power circuitry on a board 27 is electrically connected to battery casing 30 and the batteries 32*a*, 32*b* contained therein by wiring 29. In this way batteries 32*a*, 32*b* may be charged utilizing a USB plug coupled to a power source. It should be known that while the preferred non limiting embodiment is a USB charger, however any type of DC plug capable of being received in base 16 may be used.

A circuit board 40 is disposed within housing 15. Power circuitry 42 is disposed on circuit board 40. Power circuitry 42, disposed on circuit board 40, is electrically connected to batteries 32*a*, 32*b* by wiring 36, 38. Power circuitry 42 conditions the power signal to be used by the LEDs.

A second circuit board 50 is disposed within housing 15. One or more LEDs 54*a*-54*n* are disposed on second circuit board 50. The LEDs 54 may be disposed randomly across second circuit board 50, or may be formed in patterns. One such pattern would be to dispose LEDs 54 about the perimeter of second circuit board 50 at spaced intervals, either random or equal spacing. A second pattern may be a circular array of LEDs 54 more interior to second circuit board 50; either as a stand alone or in addition to an outer perimeter array of LEDs 54. A Plurality of control circuits 52*a*-52*n* are disposed on second circuit board 50 and are electrically coupled to respective one or more LEDs 54*a*-54*n*.

At least one spacer 44 disposed between circuit board 40 and second circuit board 50, supports second circuit board 50 in housing 15 in a substantially parallel stacked formation relative to first circuit board 40. An electrical connector 40 electrically connects power circuitry 42 to control circuitry 52*a*-52*n* providing a circuit from batteries 32*a*, 32*b* to LEDS 54*a*-54*n*. As a result, an electrical circuit is formed by batteries 32*a*, 32*b* connected to power circuitry 42 which in turn is connected to control circuits 52*a*-52*n* which in turn are connected LEDs 54*a*-54*n*. Additionally the circuit extends to recharger port 26. A switch 20 is disposed on diffuser connector 18 and is electrically coupled along the electric circuit to manually turn LEDs 54*a*-54*n* between an ON state and an OFF state.

In a preferred non limiting embodiment, first circuit board 40 and second circuit board 50 are disposed in parallel. The entirety of circuit boards 40,50 and battery casing 30 may be disposed within lower housing 12 to facilitate manufacture and assembly. Additionally, either or both of electrical connection 46 and spacer 44 may be support structure and/or electrical connectivity structure. Furthermore, it is well within the scope of the invention for the control circuitry 52*a*-52*n* to include an antenna for remote control, primarily ON/OFF control of LEDs 54*a*-54*n*.

As can be seen by providing an LED system for use in an AC socket, in accordance with the invention above, a DC powered self-contained bulb can be used in existing lighting structure, avoiding the shortcomings of the prior art. By forming the light housing as two distinct housings and the battery housing supporting the power circuitry PC board which in turn supports the LED PC board, the LED light is easily manufactured as the LED structure can be formed as a substantially uniform structure and inserted into the housing.

Furthermore, by providing a battery operated LED light as described above, the structure enables the use of the LED bulb in a conventional fixture where no electricity is available. In this way a conventional light fixture, even a chandelier, can be mounted in a house or office in a room not currently wired for electricity and provide light.

It should be further recognized that the invention is not limited to the embodiments described above. Accordingly, numerous modifications can be made without departing from the spirit of the invention and scope of the claims appended hereto.

The invention claimed is:

1. An LED light comprises:

a housing; the housing having a bulb shape;

a nonconductive threaded base configured to be received in a conventional light bulb socket, the housing being affixed to and extending from the base;

a charging slot formed in the threaded base;

a port in communication with the charging slot and extending within the base towards the housing;

a battery enclosure configured for receiving one or more batteries, the battery enclosure being disposed within the housing, and the battery enclosure being electrically coupled to the charging port;

a first PCB board disposed within the housing; a power circuit being formed on the first PCB board and electrically coupled to the battery enclosure to provide DC power to the first PCB board;

a second PCB board is positioned within the housing, supported by the first PCB board and stacked over the first PCB board; the power circuit being electrically connected to the second PCB board; and a plurality of LEDs arranged on the second PCB board to direct light from an end distal from the base in response to receiving a control signal and power from the second PCB board.

2. The LED light of claim 1, wherein the first PCB board is disposed in parallel with the second PCB board.

3. The LED light of claim 1, further comprising control circuitry disposed on the second PCB board and electrically connected between the power circuit and the LEDS for controlling operation of the LEDs.

4. The LED light of claim 1, wherein the battery enclosure, the power circuit, the control circuit and the plurality of LEDs form a circuit, and further comprising a switch disposed along the circuit for switching the plurality of LEDs between an OFF state and an ON state.

5. The LED light of claim 4, wherein the switch is mounted on an exterior surface of the housing.

6. The LED light of claim 1, wherein the housing includes a lower housing mounted on the base, and an upper housing disposed on the lower housing.

7. The LED light of claim 6, further comprising a diffuser band for securing the lower housing to the upper housing.

8. The LED light of claim 6, wherein the upper housing is selectively removeable from the lower housing.

9. The LED light of claim 6, wherein the upper housing is a light diffuser.

10. The LED light of claim 1, wherein the plurality of LEDS is disposed about a perimeter of the second PCB board.

* * * * *